March 11, 1958
S. R. HURSH
2,826,446
SPIKE PULLING GRAPPLE
Filed Jan. 28, 1954
5 Sheets-Sheet 2
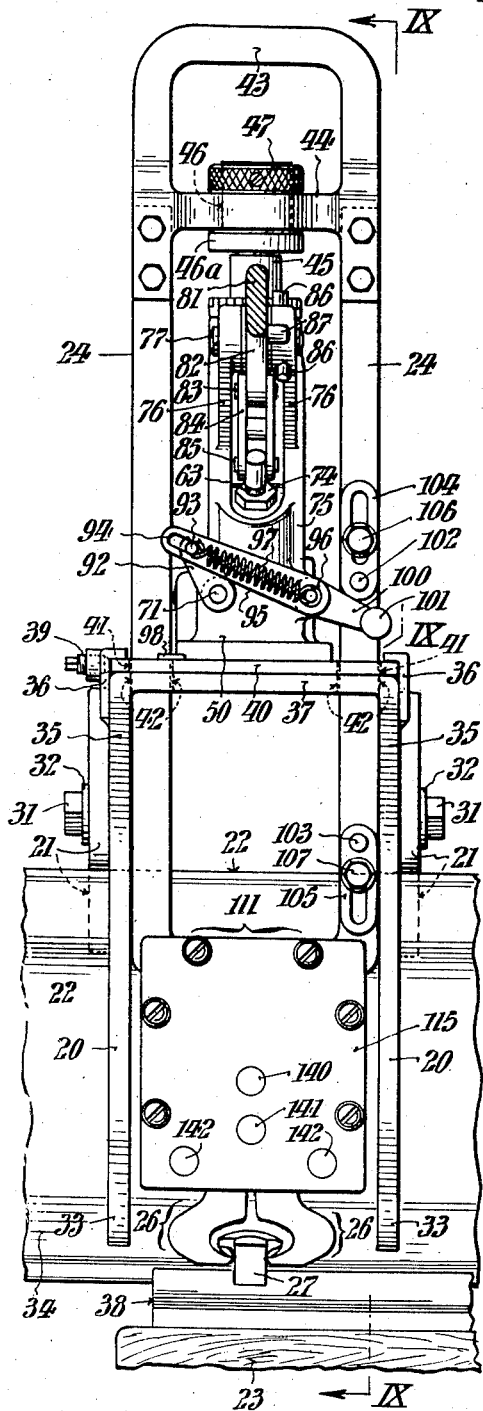
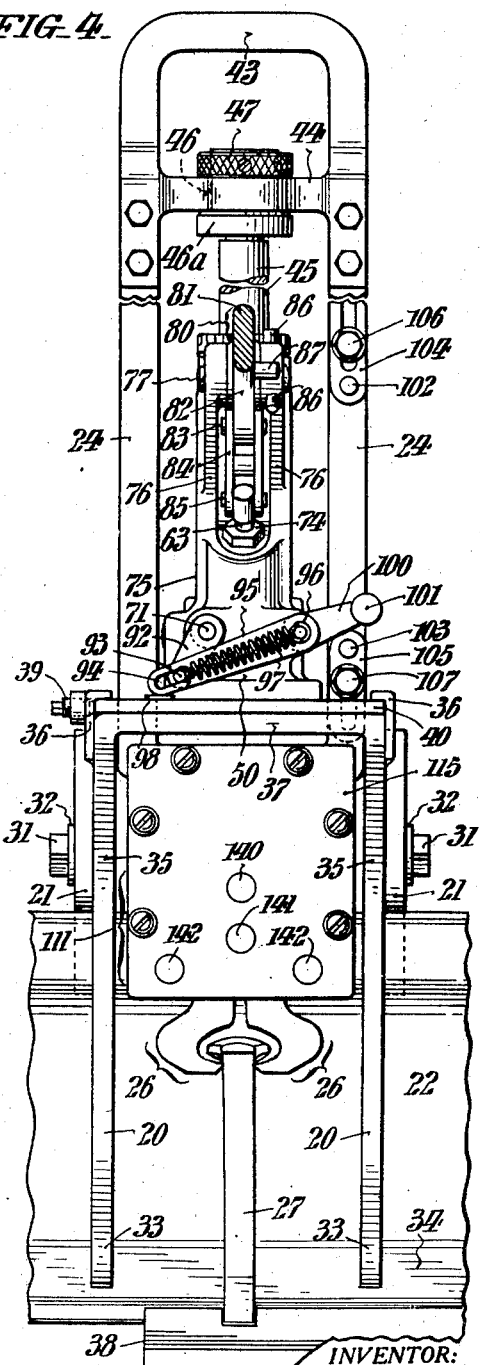
INVENTOR:
Samuel R. Hursh
BY Paul & Paul
ATTORNEYS.

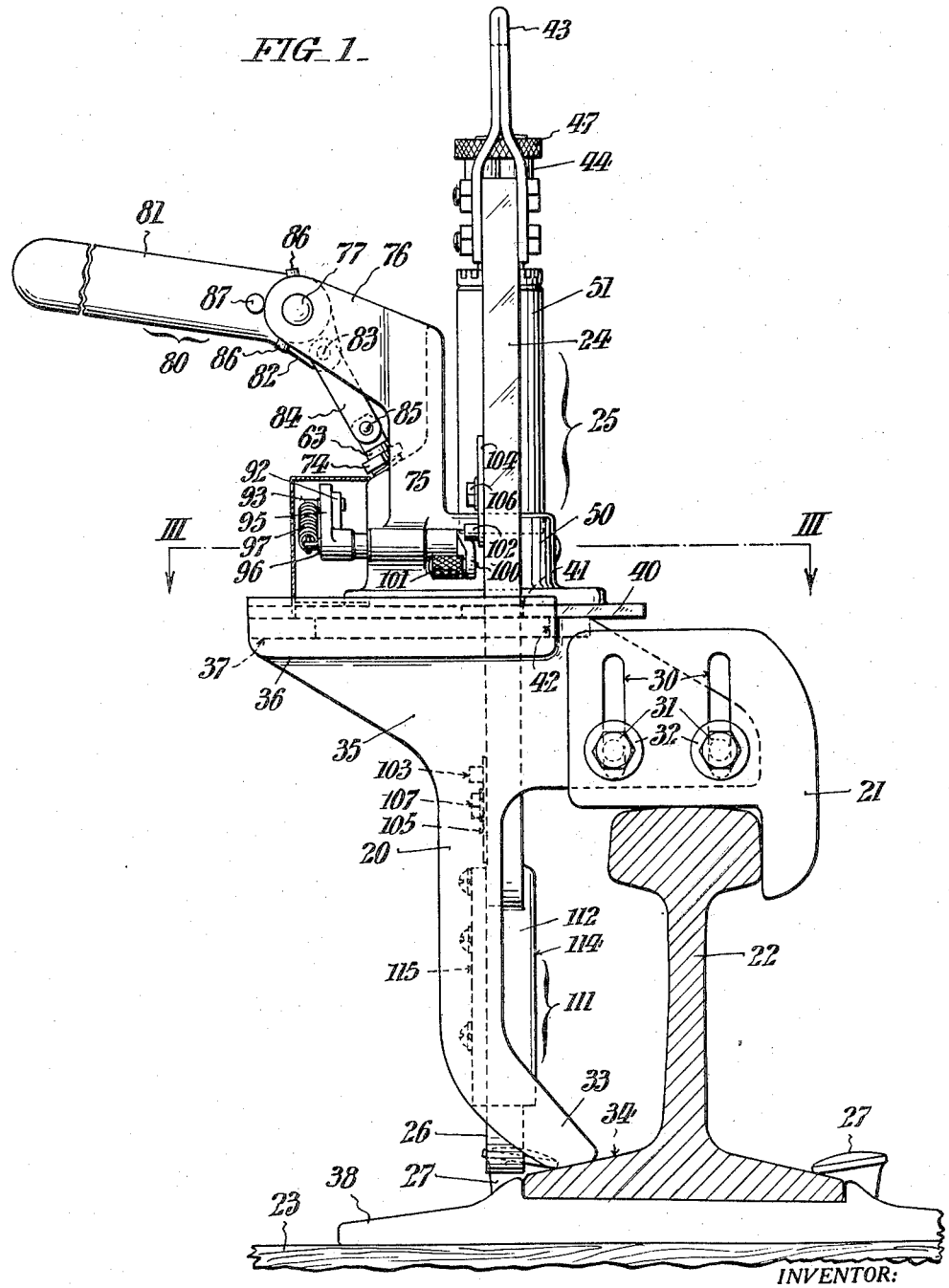

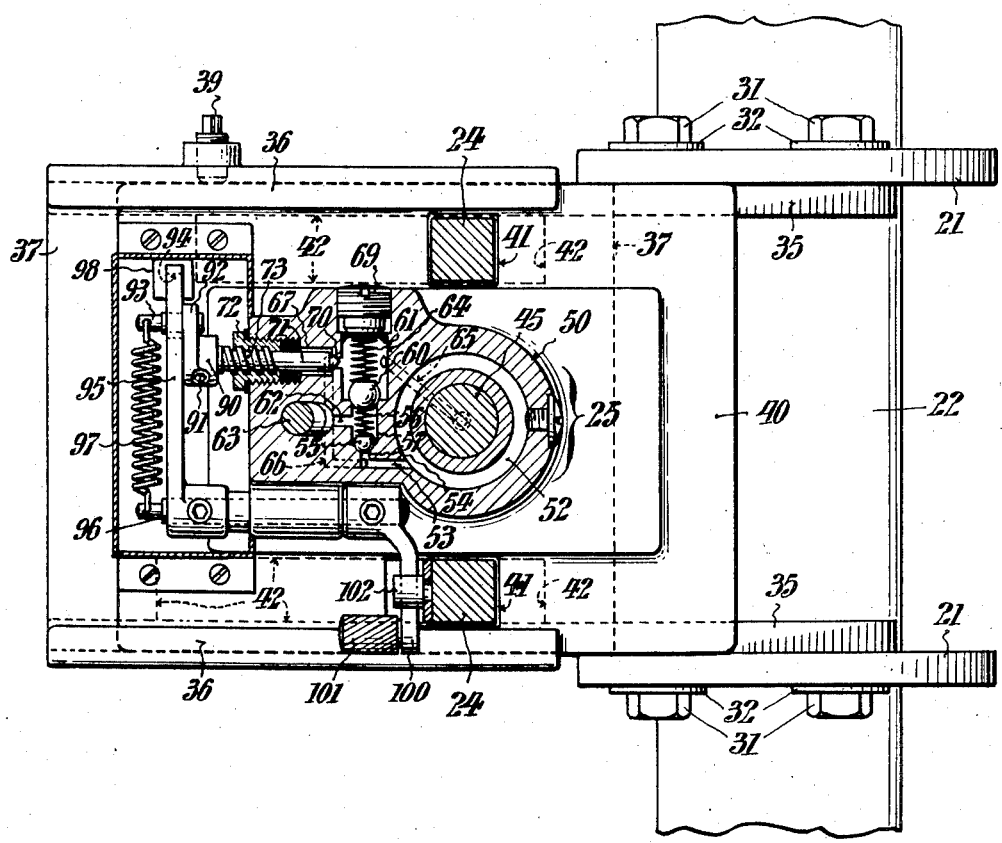
FIG_3_

March 11, 1958 S. R. HURSH 2,826,446
SPIKE PULLING GRAPPLE
Filed Jan. 28, 1954 5 Sheets-Sheet 4
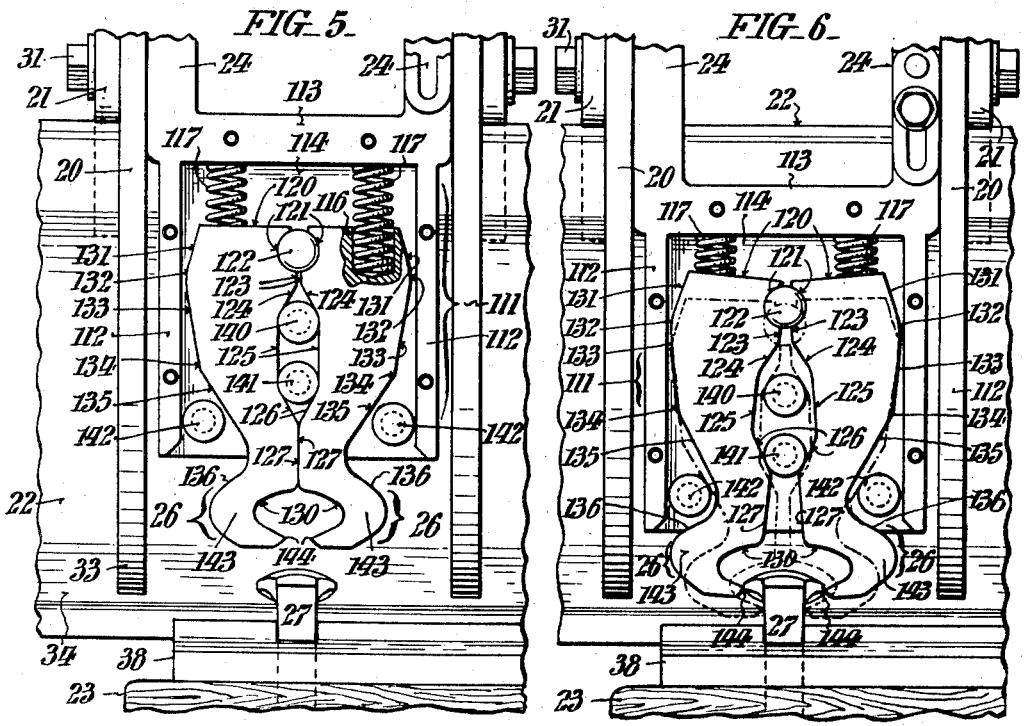
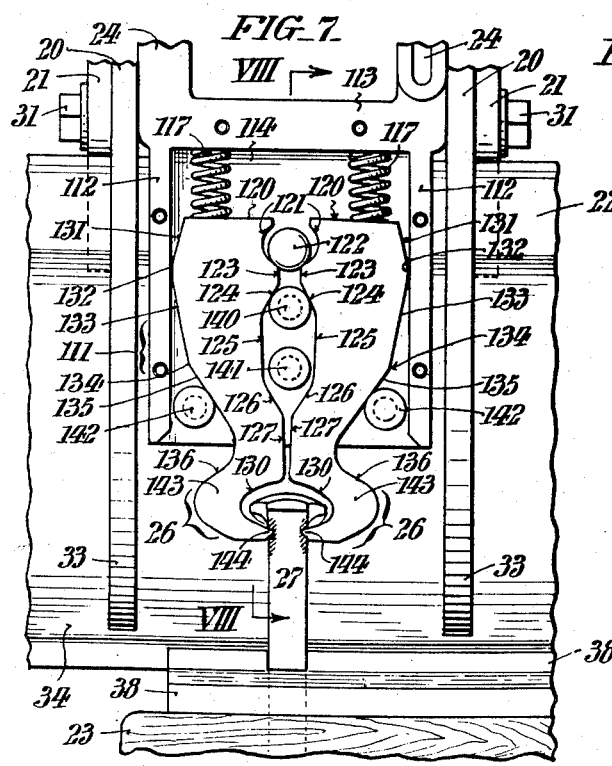
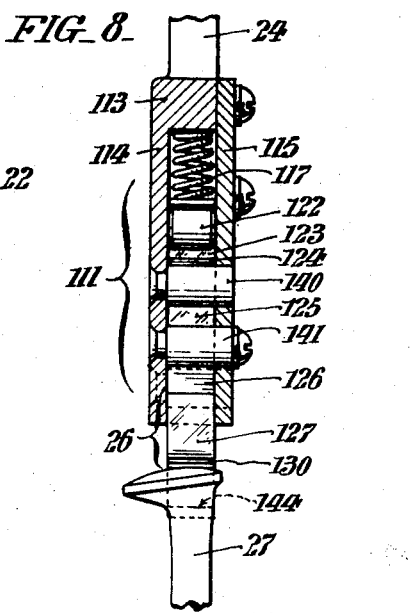
INVENTOR:
Samuel R. Hursh,
BY Paul & Paul
ATTORNEYS.

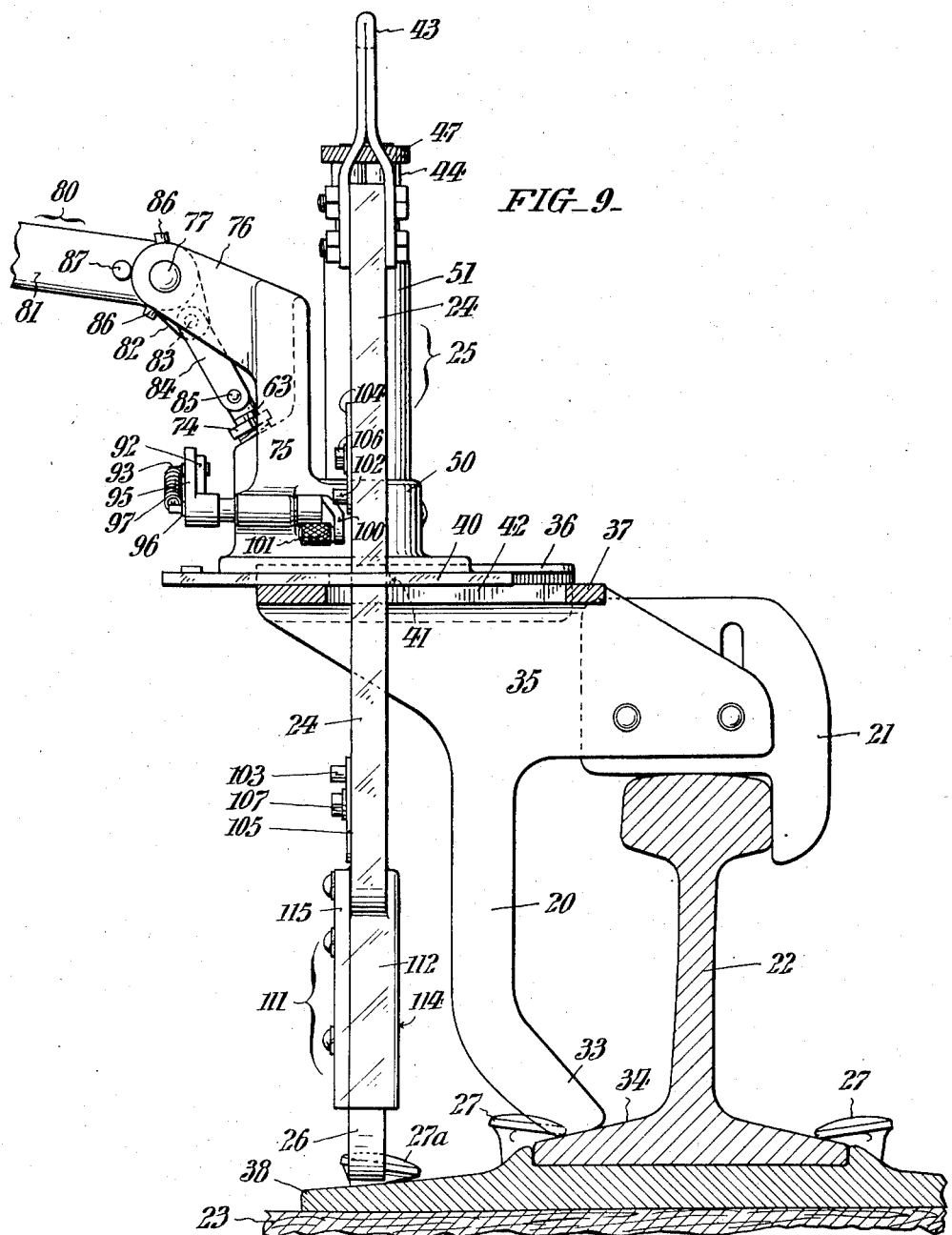

United States Patent Office 2,826,446
Patented Mar. 11, 1958

2,826,446

SPIKE PULLING GRAPPLE

Samuel R. Hursh, Bala-Cynwyd, Pa.

Application January 28, 1954, Serial No. 406,645

5 Claims. (Cl. 294—116)

This invention relates to a spike pulling grapple, and more particularly concerns a device for withdrawing spikes from objects such as ties of railroad tracks and the like. This application is a continuation-in-part of my copending application Serial No. 206,137, filed January 16, 1951, now U. S. Patent No. 2,691,505, issued October 12, 1954.

While mechanical spike pulling devices have been proposed from time to time for effecting the removal of spikes from railroad ties, these have not been successful to any great extent since they have been heavy and bulky as well as difficult to adapt for removal of spikes disposed at various distances from the rails with which they are associated. Moreover several manual operations have been necessary in connection with the use of such machines, including the steps of engaging the gripping element of the tool or machine with the spike, positioning and bracing the tool or machine with respect to the spike, and removing the spike from the gripping element of the tool or machine after it is withdrawn.

For the foregoing reasons it has been conventional in railroad practice to employ a lever or clawbar together with appropriate wedge means to apply lifting force to the base of the spike head for withdrawing the spike from the track tie. Such operations necessarily require extensive manual labor. Moreover by reason of extended exposure to the elements, spikes frequently become corroded in the area of the shaft immediately below the spike head as well as the head itself; accordingly the exertion of upwardly directed force upon the spike head is undesirable in that the spike has a tendency to break under tension at the corroded area. As a result the spike head is pulled from the spike shaft which remains in place in the tie. Subsequent removal of the shaft from the track tie is difficult and in some cases the shaft must be driven through the tie with a drift punch, a costly and undesirable feature. Removal of railroad spikes by means of clawbars and wedges as well as conventional spike pulling machines is also dangerous in that spike heads tend to be liberated suddenly by breaking because of corrosion and to fly into the air, endangering personnel, this being a source of many personal injuries.

It is accordingly an object of this invention to provide a compact and readily portable machine for withdrawing spikes from objects into which they have been driven. It is another object of this invention to provide a fluid operated spike pulling machine which may readily be braced against a track rail to effect withdrawal of the spikes from the ties of the track bed. Still another object is to provide a spike pulling machine having automatic means for engaging and releasing the spike to be pulled. Yet another object of the invention is to provide a machine for withdrawing corroded or otherwise weakened spikes from the objects in which they are embedded. It is still a further object of the invention to provide a device for withdrawing large numbers of spikes, one at a time, which is automatically rendered inoperative after each spike is withdrawn, and may immediately be re-positioned above the next successive spike to effect its withdrawal. Other objects of the invention, including the simplicity and economy of the same and the ease and safety with which it may be applied to effect withdrawal of spikes and nails from various objects, will become further apparent hereinafter.

In summary, the foregoing and other objects are accomplished by the present invention wherein the spike puller comprises a base, a rigid frame slidably mounted on said base, a grapple suspended from said frame in position to engage and disengage the spike to be pulled, a jack element on said base having capacity to slide said rigid frame up and down relative to said base, operating means for operating said jack element, and relieving means operative in response to the control means for releasing a spike after extraction and permitting the jack to return to a proper position for engaging another spike.

Of the drawings:

Fig. 1 represents a side elevation of one embodiment of a spike pulling machine in accordance with this invention. In this figure the machine is represented in position for withdrawing a rail holding spike from a point adjacent a track rail, the rail being shown in section;

Fig. 2 represents a front elevation of the spike pulling machine which appears in Fig. 1;

Fig. 3 represents a sectional view taken as indicated by the lines and arrows III—III which appear in Fig. 1;

Fig. 4 represents a front elevation of the spike pulling machine of Fig. 2, the parts of the apparatus being indicated in the positions they occupy after the spike is withdrawn from the track tie;

Fig. 5 represents a fragmentary front elevation of the spike pulling machine, with parts removed and others broken away and shown in section in order to disclose important details of the spike engaging means of the apparatus;

Fig. 6 represents a view similar to Fig. 5, showing the positions of the respective parts as the spike engaging elements are lowered against the spike head;

Fig. 7 represents a view similar to Figs. 5 and 6, showing the positions occupied by the spike engaging elements as the spike is withdrawn from the track tie;

Fig. 8 represents a sectional view taken as indicated by the lines and arrows VIII—VIII which appear in Fig. 7; and Fig. 9 represents a side elevation of the apparatus shown in Fig. 1, the machine being in position for withdrawal of a tie plate holding spike. In this figure certain portions of the apparatus are shown in section, taken as indicated by the lines and arrows IX—IX which appear in Fig. 2.

It will be appreciated that the embodiment of the invention selected for illustration in the drawings represents practical embodiment of the invention, and that it may be modified in many particulars without departing from the scope of the invention.

The illustrated embodiment of the invention includes the legs 20 constituting a base or support for the apparatus, and the rail hook 21, whereby the spike pulling mechanism may be disposed substantially vertically adjacent the side of a rail 22, above the track tie 23. Slidably mounted on the base or support is a rigid lifting yoke or frame including uprights 24, which is movable up and down relative to the track tie 23. The lifting yoke is actuated by a fluid operated jack comprehensively designated by the number 25, and carries a spike clamping element including a pair of matched spike hooks 26 which engage the spikes 27 to remove them from the ties.

Referring to Figs. 1-4 and 9 of the drawings, the base or support for the apparatus carries the slots 30 which are disposed vertically on the rail hook 21, which is adjustable vertically relative to legs 20, and may be secured in adjusted position by bolts 31 and washers 32 to accommodate rails 22 of different heights.

The legs 20 are each inwardly curved and have feet 33 the bottom edges of which are angled to bear against the beveled upper surface of rail base 34. Above the legs 20, and formed integrally therewith, are plates 35 constituting the principal support members for the jack assembly of the structure. Angle irons 36 are secured to the upper ends of plates 35 and a floor plate 37 is disposed between the plates 35 at the top thereof, to form a floor for the jack structure of the device. The horizontal flanges of angle irons 36 are spaced above floor plate 37 to accommodate the side edges of base plate 40 which is slidably mounted on floor plate 37 for movement toward and away from rail 22. Such adjustment is advantageous in that the rail-holding spikes 27 and the plate-holding spikes 27a (which, as shown in Fig. 9, secure the tie plates 38 in position on the ties) are thus readily removed. The base plate 40 may be secured in adjusted position by screws 39.

Base plate 40 has a pair of opposed apertures 41 which are substantially square as viewed in Fig. 3 of the drawings. The rigid uprights 24 are slidably disposed through said apertures 41 for reciprocation in a plane substantially perpendicular to the planes of floor 40 and floor plate 37. Floor plate 37 has a pair of laterally disposed slots bounded by the edges 42 (see Figs. 3 and 9) such slots accommodating the uprights 24, permitting the base plate 40 to slide horizontally toward and away from the rail 22.

The rigid uprights 24 are connected together by the transverse handle piece 43 bolted thereto, and also by the curved cross plates 44 which are connected to the fluid operated jack 25, in a manner further to be described.

The fluid operated jack 25 is mounted on the base plate 40 and has a main shaft 45 carrying a substantially cylindrical lifting head 46. The lifting head 46 is fixed on the shaft 45 and carries at its base a cylindrical shoulder 46a. The curved cross plates 44 are matched and disposed immediately around the cylinder of lifting head 46, and have their bottom edges immediately above the shoulder 46a. The lifting head is secured in position by the knurled collar 47 which contacts the top edges of cross plates 44 completing the connection of the jack shaft to the slidable frame.

Jack base 50 is mounted on base plate 40 and serves as a support for the jack barrel 51 in which main shaft 45 is tightly fitted. Jack base 50 is partially hollow (see particularly Fig. 3 of the drawings) and encloses the fluid reservoir 52. Opening from reservoir 52 is fluid passage 53 to which is connected an angled fluid passage 54. The base 50 is internally bevelled to form a seat for ball check valve 55 which is normally urged against such seat by spring 56 which bridges the central passage 57 and bears against a second ball check valve 60. Spring 56 is normally under compression. The base 50 is internally bevelled to provide a seat for ball check valve 60, which is normally urged against such seat by the spring 61. Passage 62 communicates with central passage 57 and also with the upwardly angled bore in which the plunger 63 reciprocates. The spring 61 bridges across chamber 64 which communicates with conduit 65 leading in turn to the vertically disposed bore in which the shaft 45 travels.

Also disposed in the jack base 50 is the separate inclined passage or by-pass line 66 which leads directly from passage 53 to a chamber 67. Passage 66 does not connect with passage 62 or with the bore in which plunger 63 reciprocates. Chamber 67 communicates through a port 70 to the chamber 64. However the port 70 is bevelled to provide a seat coacting with the bevelled end of valve stem 71 to make and break fluid communication between the chambers 67 and 64.

Valve stem 71 is disposed through a threaded bushing 72 which is worm threaded internally to mesh with the worm 73 formed integrally with shaft 71. Plug 69, threaded into the jack base 50, seals the opening provided for draining and filling the internal passages and also provides a seat against which the spring 61 may bear. Upon removal of drain plug 69 the ball check valves 55, 60 become inoperative, facilitating draining.

It is pertinent to point out at this point that pressure may be applied to raise the shaft 45 by closing valve 71 in port 70 and reciprocating the plunger 63. During the course of movement of the plunger 63 upwardly, fluid is withdrawn from chamber 52 through passages 53, 54 and ball check valve 55. During the down stroke of the plunger fluid is forced through ball check valve 60, chamber 61 and passage 65 to raise main shaft 45. The jack may be lowered by opening valve 71 whereby fluid under pressure is returned through passage 65, chamber 64, port 70, passages 66 and 53 to reservoir 52, by-passing the ball check valves.

The plunger 63 is slidably disposed with fluid-tight fit through the bushing 74 threaded to the base 50 of the jack. Also mounted on the base 50 is a standard 75 having a pair of spaced arms 76. Pivotally mounted on the pivot 77, and having its central portion disposed in the space between the arms 76, is the crank lever 80 consisting essentially of the handle arm 81 and the link-engaging arm 82. Link-engaging arm 82 is pivotally connected by means of pins 83 to each of the pair of swinging links 84 which are in turn pivotally attached to the free upper end of plunger 63 by means of pin 85. Limit pins 86 are mounted on one of the spaced arms 76 in the path of travel of a fixed stud 87 formed integrally with handle arm 81, thereby limiting the extent of arcuate movement of the crank lever 80 about the pivot 77. It will be observed that the arms 81 and 82 and the plunger 63 are so arranged relative to one another that the plunger 63 is positioned at the lower end of its path of reciprocation when the handle 81 and arm 82 are midway in the arcs in which they travel. Accordingly for each stroke of the handle 81 in a single direction between the limit pins 86 the plunger travels two strokes the full length of its reciprocating path. Thus the plunger 63 completes a full cycle comprising a pressure stroke and return for each half cycle of the handle 81.

The fluid operated spike puller selected for illustration in the drawings also embodies means for activating and inactivating the jack in response to the movement of the sliding frame uprights 24. It will be observed (Fig. 3) that a sleeve 90 is secured by means of set screw 91 to valve shaft 71. Lever arm 92, formed integrally with sleeve 90, has a peg 93 rigidly affixed near its free end. Peg 93 is disposed and travels within the longitudinal slot 94 in control lever 95 which is pivoted to the jack base 50 by horizontal pivot shaft 96. A spring 97 is attached to peg 93 and pivot shaft 96 and maintained under tension, tending to urge the peg 93 and shaft 96 toward one another. Control lever 95 has an integrally formed extension arm 100 carrying a knob 101 which may be gripped by hand for manual operation of the lever. Extension arm 100 is disposed in the path of movement of the upper and lower actuator pins 102, 103 respectively mounted on slotted straps 104, 105 (Figs. 1, 2) and adjustably secured in position to an upright 24 by bolts 106, 107. The actuator pins serve to operate the control lever 95 in response to the movement of the upright 24, thereby closing and opening the valve 71 associated with the passage or by-pass 66 to activate and inactivate the fluid operated jack in response to the movement of the upright 24. The exposed parts of the activating and inactivating means just described are preferably mounted within a housing as shown in section in Fig. 1, for protection against the elements. For the sake of clarity, such housing is not indicated in Figs. 2, 4 and 9.

The spike clamping element of the apparatus includes the hooks housing 111, see Figs. 5–8, within which the spike hooks 26 are slidably disposed. Hooks housing 111 has a pair of spaced vertical end walls 112 each formed integrally with one of the uprights 24, cross brace 113 which constitutes the top wall of the hooks housing, back plate 114 which is integral with end walls 112, and front plate 115 which is removably bolted to the end and top walls of the hooks housing.

Each of the spike-engaging hooks 26 has a cylindrical opening 116 (see Fig. 5) accommodating a coil spring 117, which bears against stop wall 113 and against the hook 26 at the base of the opening 116. Each coil spring 117 is maintained under compression and urges the hook body away from top wall 113.

Each spike engaging hook 26 has a flat upper surface 120 and also has a round indentation 121 disposed near the top of the inner hook side surface, for accommodation of cylindrical insert 122 which is free of connection to any wall of the hooks housing 111. The inner side surface of each hook also comprises a vertical portion 123, the downwardly outwardly sloping surface 124, vertical surface 125, downwardly inwardly sloping surface 126, vertical surface 127, and concave hook surface 130. The outer side surface of each hook consists of the uppermost surface 131 which is inclined downwardly and outwardly, a corner 132, a downwardly inwardly sloping surface 133 of moderate slope, corner 134, downwardly inwardly sloping surface 135 having greater slope than surface 133, and the hook outside surface 136.

Rigidly mounted on back wall 114 of hooks housing 111 are a pair of upper and lower central vertically aligned posts 140, 141. At the lower corners of the housing, and also rigidly mounted on back wall 114, are the rigid posts 142. The rigid posts coact with the specifically defined surfaces to swing the claws 143 of the spike hooks 26 toward and away from one another in response to the movement of the uprights 24, accordingly engaging and releasing each spike in definite sequence and in predetermined relationship with the operation of the other elements of the machine. The rigid posts assume the role of cams while the inner and outer side surfaces of the hooks are cam followers actuated by the cams in a specific manner further to be described hereinafter.

The claws 143 include the concave surface 130 providing a hollow portion or indentation larger than the space occupied by the corresponding portion of the head of the spike to be pulled. Thus the spike head is accommodated between the claws substantially free of contact with the claws. Moreover the claws 143 of the spike hooks 26 have sharp points 144 which are spaced inwardly of the outer extremity of concave surface 130, so that the points 144 will engage and bite the shaft of the spike at a point below the spike head while the spike head is substantially free of contact with the claws of the spike engaging hooks. Points 144 are spaced slightly outwardly of the vertical surfaces 127, to an extent less than half the transverse dimension of the spike shaft, so the points 144 will bite the spike shaft to effect direct engagement therewith, even though the spike shaft may have been corroded in the manner indicated by the shade lines which appear in Fig. 7. This is highly advantageous in that the danger of pulling the spike head from the spike shaft during the pulling operation is minimized by providing direct bite on the spike shaft, free of contact with the head.

In operation, the spike pulling machine is positioned adjacent the rail 22, the rail hook 21 is adjusted vertically, and base plate 40 is initially adjusted toward or away from the rail 22 and secured in adjustment to position the spike hooks 26 directly above a selected spike 27. The operator grasps the handle piece 43, holding the uprights 24 in their upper positions, as in Fig. 4, and exerts downwardly directed force, sliding the uprights 24 downwardly. Thus the operator presses the bottom surfaces of claws 143 against the top surface of the spike 27. The spike hooks 26 are slid bodily upwardly against the resistance of springs 117, as indicated in Fig. 6. The lower pin 141, bearing against the downwardly inwardly inclined faces 126, swings the claws 143 outwardly away from one another, as indicated by the solid line positions of the hooks 26 in Fig. 6, and the points 144 of the claws 143 travel around the upper periphery of the spike head to effect contact near the outer edge on the lower surface of the spike head. The operator then stops exerting the downwardly directed force on the handle piece 43 and, under the influence of coil springs 117, the hooks 26 are slid bodily downwardly to reach the position shown in dot-dash lines in Fig. 6 of the drawings. In such position the points 144 of the claws 143 engage directly upon the shaft of the spike and the hooks and claws are free of contact with the spike head.

As the uprights 24 move downwardly the actuator pin 102 moves against the extension arm 100, swinging extension arm 100 downwardly and control lever 95 upwardly, toward the horizontal, about pivot 96. This applies additional tension to spring 97. As the control lever 95 passes the horizontal, spring 97 acts through peg 93 and slot 94 to snap the control lever upwardly to its upper limit position, revolving worm 73 and advancing valve shaft 71 to close the port 70.

At this point in the sequence of steps the control lever 95 is in the position represented in Fig. 2 of the drawings, by-pass line 66 thereby being closed by valve 71. The operator reciprocates the handle 81, operating the plunger 63 to slide the uprights 24 and hooks housing 111 upwardly. The upper pin 140 bears against the downwardly outwardly inclined faces 124, moving the upper ends of the hooks 26 outwardly, as shown in Fig. 7. Similarly in response to the upward movement of the hooks housing 111 the rigid posts 142 bear against the downwardly inclined cam follower surfaces 135 urging the claws 143 toward one another, causing the claws 143 to bite into the spike shaft below the spike head. Upon continued reciprocation of handle 81 the upwardly directed force on hooks housing 111 is increased, with increased bite pressure on the spike shaft. Further reciprocation of handle 81 provides sufficient force to withdraw the spike 27 from the tie 23 and it is lifted clear of the tie. As the spike 27 is lifted from the tie the effective lifting force decreases sharply, releasing the bite of the hooks on the spike shaft. The spike may then be removed manually from the claws 143.

As the uprights 24 travel upwardly the actuator pin 103 approaches the extension arm 100 and eventually moves the extension arm 100 upwardly, swinging control lever 95 about pivot 96, against the resistance of spring 97, toward the horizontal. As control lever 95 swings below the horizontal, the spring 97, acting through peg 93 and slot 94, causes it to snap suddenly to its lower limit position, as shown in Fig. 4, wherein the free end of control lever 97 bears against limit piece 98. This revolves the worm 73 withdrawing valve shaft 71 and establishing communication between chamber 64 and bypass conduit 66. Pressure is thereby released to reservoir 52 and the spike pulling machine is then readily positioned directly above another spike for repeating the spike-pulling operation.

The structure wherein the rail hook 21 rests upon the top of the rail and engages the side of the rail opposite the legs 20, and wherein the feet 33 engage upon the base 34 of the rail 22, is particularly advantageous. By reason of such construction the machine may be slid along the rail, from spike to spike, thereby rapidly withdrawing successive spikes from successive track ties. Moreover the spike engaging hooks are also adjustable toward and away from the rail and can withdraw any spike so located that the machine can be positioned to exert an upward pull thereon.

While the jack element of the machine is preferably a hydraulic device employing a liquid fluid such as oil or the like as a pressure transmitting medium, other fluids are contemplated as effective and equivalent pressure transmitting media. It will also be appreciated that, although the invention has been described in detail, it may also be practiced by substituting a wide variety of modifications or equivalents for the elements shown and described herein. All such modifications, including reversals of parts and the use of certain features independently of the use of other features, are within the spirit and scope of the invention as defined in the appended claims.

Having thus described my invention, I claim:

1. A grapple for use in a device for withdrawing spikes from track ties comprising a housing, a pair of adjacent spike-engaging clamp elements slidably contained in said housing, means confining said clamp elements within said housing, said hooks being free of connection to each other and to said housing said clamp elements having claws extending out of the bottom of said housing, resilient means having a portion fixed with respect to the housing and having another portion acting upon said clamp elements normally urging them downwardly in said housing, first clamp-actuating means fixed on said housing in a location to contact said clamp elements to move the upper ends of said clamp elements away from one another in response to a force acting downwardly against the claws of the clamp elements, and second clamp-actuating means also fixed on the housing in a position to contact said clamp elements to move the claws of the clamp elements together to engage the spike in response to force acting downwardly against the clamp elements, said second hooks-actuating means being spaced apart from said first hooks-actuating means in a generally upward and downward direction.

2. The grapple defined in claim 1 further characterized by the fact that the claws have opposed recesses larger than the head of the spike, and have claw edge elements below said recesses, said claw edge elements having a size and length to engage opposed sides of the spike shaft below the spike head while the spike head is positioned in said recesses substantially free of contact with said claws.

3. A grapple for use in a device for withdrawing spikes from track ties comprising a housing, a pair of adjacent spike engaging hooks slidably contained in said housing, said hooks being free of connection to each other and to said housing, means confining said hooks within said housing, claws on said hooks outside said housing for engaging said spikes, first hook-actuating means fixed within said housing in a position to contact said hooks and move said claws away from one another in response to a force acting upwardly against the ends of the hooks, second hooks-actuating means also fixed within the housing in a position to contact and move the upper ends of the hooks away from one another in response to force acting downwardly on said hooks, and third hooks-actuating means fixed within said housing and spaced apart from said second hooks-actuating means in a generally upward and downward direction in a position to move the claws toward one another as the upper ends of the hooks are moving away from one another in response to said force acting downwardly on said hooks.

4. A grapple for use in a device for withdrawing spikes from track ties comprising a housing having rigid walls and having an opening at the bottom thereof, a pair of spike engaging hooks slidably mounted in said housing independently of each other and extending out through said bottom opening, means confining the hooks within the housing, resilient means in said housing bearing against the top of the housing and against said hooks continuously urging said hooks bodily downwardly toward the lower end of the housing, said hooks having inclined sides, and fixed posts adjacent said hooks in said housing, said posts being positioned to contact and bear against the sides of the hooks to swing the hooks sidewardly and engage and disengage the hooks with and from the spikes in response to generally vertical movement of the housing with respect to said spikes, and to swing the upper ends of said hooks away from one another and concurrently swing the lower ends of said hooks toward one another, said posts being spaced apart from one another in a substantially vertical direction and located on opposite sides of said hooks, said hooks being freely slidable within said housing except as restricted by force applied by said resilient means and by said fixed posts.

5. A grapple for use in a device for withdrawing spikes from track ties comprising a housing having an open bottom, a pair of spike engaging hooks free of connection to each other and slidably mounted in said housing, means confining said hooks within said housing said hooks having claws at their lower ends extending out below said open bottom, the upper portions of said hooks having matching opposed inner faces each including at lease one outwardly and one inwardly inclined face, said faces forming an indentation between the upper portions of said hooks, a pair of posts fixed to said housing between said hooks and between said inclined faces and vertically disposed in said indentation, said posts being spaced apart at a distance less than the distance between said upper inclined faces and said lower inclined faces, one such post being positioned adjacent one set of opposed inclined faces, to bear against said faces and the other such post being positioned adjacent the other set of inclined faces to bear against said other faces.

References Cited in the file of this patent

UNITED STATES PATENTS

| | | |
|---|---|---|
| 592,499 | Stephens | Oct. 26, 1897 |
| 729,939 | Jones | June 2, 1903 |
| 925,557 | Bramstadt | June 22, 1909 |
| 1,405,664 | Clark | Apr. 3, 1923 |
| 1,938,485 | Cossor | Dec. 5, 1933 |
| 2,263,910 | Williams | Nov. 25, 1941 |
| 2,570,915 | Buck | Oct. 9, 1951 |
| 2,579,878 | Stone | Dec. 25, 1951 |